Figure 1:
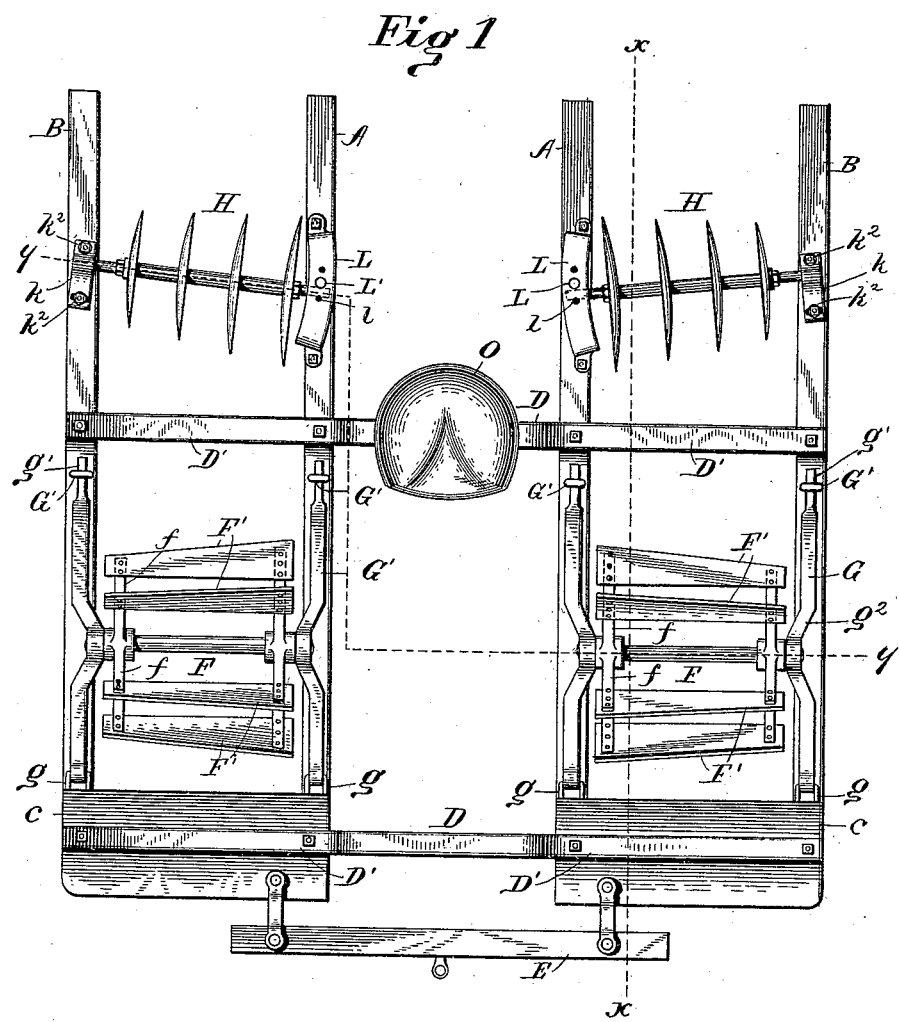

(No Model.) 2 Sheets—Sheet 1.

C. C. & W. C. SPAULDING.
COMBINED CULTIVATOR AND WEED CUTTER.

No. 488,779. Patented Dec. 27, 1892.

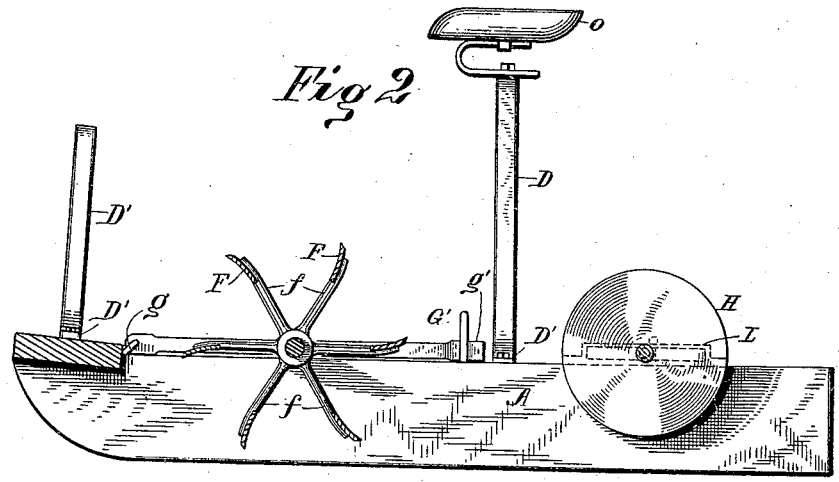
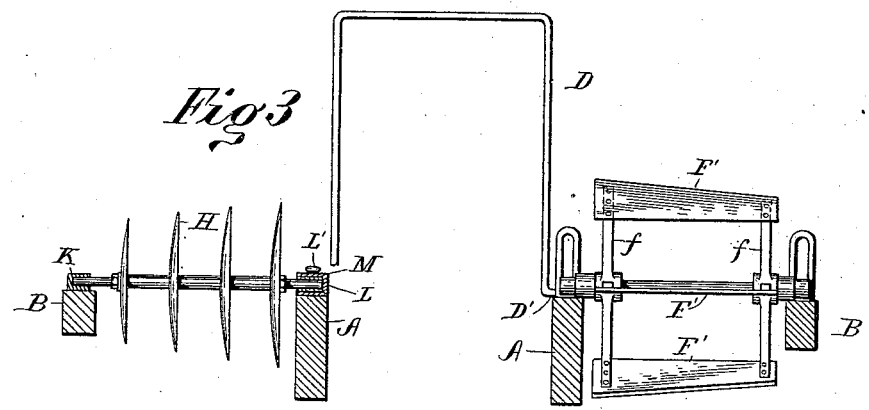
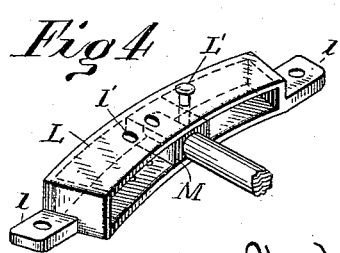
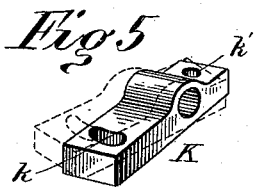

UNITED STATES PATENT OFFICE.

CHARLES C. SPAULDING AND WILLIAM C. SPAULDING, OF WHITING, IOWA.

COMBINED CULTIVATOR AND WEED-CUTTER.

SPECIFICATION forming part of Letters Patent No. 488,779, dated December 27, 1892.

Application filed March 22, 1892. Serial No. 425,985. (No model.)

*To all whom it may concern:*

Be it known that we, CHARLES C. SPAULDING and WILLIAM C. SPAULDING, citizens of the United States, residing at Whiting, in the county of Monona and State of Iowa, have invented certain new and useful Improvements in a Combined Cultivator and Weed-Cutter; and we do hereby declare the following to be a full, clear, and exact description of the invention, such as will enable others skilled in the art to which it appertains to make and use the same.

This invention relates to an improvement in combined cultivators and weed cutters designed more particularly for use in listed corn fields, and it consists in the construction and arrangement of parts more fully hereinafter described and definitely pointed out in the claims.

The object of this invention is the provision of an improved, effective and inexpensive cultivator and weed-cutter for use in listed corn. This object we attain by the construction illustrated in the accompanying drawings wherein like letters of reference indicate corresponding parts in the several views, and in which Figure 1, is a top plan view. Fig. 2, is a longitudinal section on the line $x$—$x$ of Fig. 1. Fig. 3, is a cross-section on the line $y$—$y$ of Fig. 1, and Figs. 4 and 5 are detail perspective views of the journal boxes for the cutters.

In the drawings A represents the inner runners and B the outer runners, which are of a width approximately one half the width or height of the inner runners, whereby the outer runners move on the top of the hills, while the inner runners occupy a position in the ditch. The inner and outer runners on the respective sides are united at their forward ends by cross-bars C and the adjacent inner runners are connected by the U-shaped bars D, the outer ends of which, as at D' extend across from the inner runners to the outer runners and constitue rigid braces for the same.

E represents the bar to which the doubletree is attached, the same being secured to the cross-bars C.

Mounted between the inner and outer runners, at or near the front of the machine are the weed-cutters or breakers F, the same consisting of a horizontal shaft having radial arms $f$ extending out therefrom on opposite ends thereof, the outer arms being less in length than the inner arms. On the outer ends of these arms are secured tapering cutting-plates F' formed with inclined upper edges, inclining toward the outer sides of the machine. These blades are arranged at intervals (as shown in Fig. 2), their inclination placing them substantially parallel with the inclination of the hills. The outer ends of the shafts of the cutter-reels are journaled in suitable bearings formed in longitudinal bars G, the forward ends of which are pivotally secured to the runners by staples $g$, while their rear ends are reduced to form tongues $g'$ and are placed in vertically disposed U-shaped staples G' secured in the upper edges of the runners. These staples are of a length sufficient to permit of a vertical movement of the tongue therein, so that the cutting-reels will be allowed a vertical movement, should the same come in contact with stones or other obstructions. The bars G are carried inward at or about their centers, as at $g^2$, so that all lateral movement is prevented.

Located between the inner and outer runners, on the respective sides, at a point in the rear of the bars G' are the disk cultivators H, formed of a series of graduated disks the one of smallest circumference being located at the outer ends of the shafts, while those of the largest circumference are located at the inner ends of the shafts. As is usual with the class of cultivators, it is necessary to increase or decrease the angle at which they are placed and to this end we form boxes K on the outer runners, in which the outer ends of the shafts are journaled, the forward ends of the boxes having curved, elongated slots $k$ therein, while the rear ends have bolt holes $k'$. Suitable bolts $k^2$ are passed through these openings and by virtue of the elongated slot, the bearings may be adjusted laterally, as shown in dotted lines Fig. 5.

On the upper edges of the inner runners are formed curved guide-ways L, the same being closed on all sides, except that opposite the disks of the cultivator, and are provided with ears $l$, by which they are attached to the runners. Through the top and bottom plates of this box L are formed apertures l' through which the abutting bolts L' are passed. M represents a journal bearing consisting of a flat faced block fitted within the guide L and permitted a longitudinal movement therein. In this block the end of the shaft of the of the cultivator is secured, and when it is desired to adjust the cultivator at a different angle the blocks are moved forward and the pin L' is passed through one of the apertures, directly in the rear of the block, thereby forming a stop against which the block abuts. On the upper face of the U-shaped cross-bar D in the rear is the driver's seat O.

By this construction it will be seen that this invention is particularly adapted to listed corn and that the adjustment of the cultivators may be readily made while the cutting reels are so located and arranged that the weeds will be broken or cut and at the same time injury to the knives is prevented by the vertical movement allowed by the swinging nature of the bearings.

We are aware that many minor changes in the construction and arrangement of parts can be made without in the least departing from the nature and principle of our invention.

Having thus described our invention what we claim as new and desire to secure by Letters-Patent is:—

1. In a weed-cutter and cultivator for listed corn, the combination with the inner runners, of outer runners of less width than the inner runners, means for uniting the runners, cutting reels mounted between the outer and inner runners, on opposite sides, vertically movable bearings for the reels, and adjustable cultivators between the runners in the rear of the cutting-reels, substantially as described.

2. In a weed-cutter and cultivator for listed corn, the combination with the inner runners, of the outer runners formed of a width less than the width of the inner runners, U-shaped cross-bars connecting the inner runners and connections for the inner and outer runners, revolving cutting-reels mounted between the inner and outer runners on opposite sides, having cutting knives with inclined outer edges, the inclination of which is longitudinal relative to the reel-shaft, means for permitting the vertical movement of the cutters and cultivators in the rear of the cutters, substantially as described.

3. In a weed-cutter and cultivator the combination with the runners, of a cutting-reel mounted between the runners having knives with downwardly and outwardly inclined edges, supporting bars for the reels, hinged at one end to the runners and elongated guides for the rear ends of the supporting bars, substantially as described.

4. In a weed-cutter and cultivator for listed corn, the combination with the runners, of graduated disk cultivators arranged between the runners, a shaft on which the disks are mounted, a journal box mounted on the outer runner having a curved slot in one end thereof a bolt hole in opposite ends bolts passing through the hole and slot, a curved guide bearing having an open outer face a journal block located in the bearing, means for limiting the movement of the block and journals on the ends of the cultivator shaft mounted in said bearings, substantially described.

5. In a weed-cutter and cultivator for listed corn, the combination with the inner runners, of outer runners formed of width less than that of the inner runners, means for connecting the runners, cutting reels mounted between the inner and outer runners consisting of a shaft having radial arms at opposite ends the arms on the outer end being less in length than those on the inner ends, tapered cutting blades secured on the outer ends of the arms and a graduated series of disk cultivators mounted on shafts in the rear of the cutters, substantially described.

In testimony whereof we affix our signatures in presence of two witnesses.

CHARLES C. SPAULDING.
WILLIAM C. SPAULDING.

Witnesses:
  FRED MCCAUSLAND,
  G. H. ELLIOTT.